United States Patent [19]
Poehlman et al.

[11] Patent Number: 5,082,173
[45] Date of Patent: Jan. 21, 1992

[54] ENVIRONMENTAL CONTROLLER FOR A SEALED STRUCTURE

[75] Inventors: William F. S. Poehlman; Darel E. Mesher, both of Hamilton, Canada

[73] Assignee: McMaster University, Hamilton, Canada

[21] Appl. No.: 482,574

[22] Filed: Feb. 21, 1990

[30] Foreign Application Priority Data

Feb. 22, 1989 [CA] Canada .................................. 591,734

[51] Int. Cl.$^5$ ............................................. B01F 3/02
[52] U.S. Cl. ........................................ 236/11; 165/16; 236/44 A
[58] Field of Search .................... 165/16, 21; 236/49.3, 236/94, 11, 44 A X

[56] References Cited

U.S. PATENT DOCUMENTS

| | | | |
|---|---|---|---|
| 3,979,922 | 9/1976 | Shavit | 165/16 |
| 4,457,357 | 7/1984 | Van Arnhem | 165/21 |
| 4,653,574 | 3/1987 | Quinlisk et al. | 165/54 |
| 4,947,928 | 8/1990 | Parker et al. | 236/49.3 X |
| 4,953,784 | 9/1990 | Yasufuku et al. | 236/44 A |

*Primary Examiner*—William E. Wayner
*Attorney, Agent, or Firm*—Rogers & Scott

[57] ABSTRACT

A dynamic environmental control system for managing the environment in a super insulated tightly sealed home which has a heat recovery ventilator connected to a forced air heating system for ventilation. The system controls indoor temperature, humidity and fresh air levels as well as temperature gradients using a heat recovery ventilator, heater and an air ventilation fan. The system can initiate operation of the heat recovery ventilator to exchange moist and polluted inside air for drier fresher outside air to control both inside moisture and air pollutant levels. Air exchanges can be initiated by an internal system timer, manually by building occupants or by the system in response to humidity levels inside the home. The system will determine the moisture contents of inside and outside air and will only attempt to exchange air to lower inside humidity levels when the outside air contains less moisture than the inside air. The system can operate to minimize window glass condensation caused by excess inside humidity or to minimize humidity levels. A seven day, four temperature setback thermostat is incorporated in the system to control operation of the heater. There is also a temperature gradient monitor which will operate the air ventilation fan without the heater to redistribute air inside the home and minimize temperature gradients.

5 Claims, 9 Drawing Sheets

ENVIRONMENTAL CONTROLLER FOR A SEALED STRUCTURE

The present invention relates to environmental control of heated buildings and more particularly, the control of moisture, air pollutant and temperature levels in tightly sealed homes which use heat recovery ventilators for ventilation.

Although the invention will be described with reference to tightly sealed, super insulated homes, it can also be used in many other types of tightly sealed buildings.

REVIEW OF PRIOR ART

With the onset of the energy crisis and rising fuel costs, the design and construction of energy efficient housing for cold climates has become a goal of considerable importance. This is particularly true for cold northern climates such as those found in central Canada, where heating can be required for six months of the year or more and where during the heating season most precipitation falls as snow.

One very effective way of minimizing energy consumption under these circumstances has been to construct super insulated homes which are tightly sealed against drafts. Generally these homes contain twice the insulation required in prevailing building codes, along with double or triple glazed windows. The envelope of this type of home is completely encased in a polyethylene air/vapor barrier, and all of its windows and doors are fitted with special seals to prevent the escape of heated inside air and its subsequent replacement by cool outside air. These homes are often designed as passive solar structures with one wall containing a large expanse of windows and the rest containing a minimum of window area.

Early experimental homes built to these standards experienced dramatic energy savings, but suffered from several drawbacks. Firstly, because they were so tightly sealed, it was found that moisture created by everyday activities such as breathing, bathing and cooking and by the operation of appliances, such as self defrosting refrigerators and steam irons, was building up inside the structures causing human discomfort and building shell damage. The tight sealing of these structures also prevented the natural exchange of stale inside air for fresh outside air which lead to elevated indoor air pollutant levels. Finally, the passive solar designs utilized in many of these structures provided differential heating which resulted in large interior temperature gradients. Thus some sections of these homes were overheated while others remained cold.

Referring firstly to humidity problems, it will be noted that a dedicated dehumidifier can be used to remove excess moisture, but in tightly sealed homes this approach is rarely used. The reason for this is that the dehumidification process creates heat, and in a tightly sealed home a dehumidifier creates a substantial amount of heat because of the large amounts of moisture which must be removed. This heat is produced intermittently as the dehumidifier cycles on and off, and it can play havoc with a home's heating control system. In addition, a substantial amount of energy will be used by a dehumidifier in removing the large amounts of moisture which accumulate in tightly sealed homes, such consumption being at odds with the concept of an energy efficient home.

Instead of using a dedicated dehumidifier, it has become common practice to use a heat recovery ventilator (HRV) for humidity control. A HRV is an air exchange fan which is used to exchange warm indoor air for colder outdoor air through a heat exchanger to minimize heat loss. Tightly sealed homes require a HRV to maintain a flow of fresh air, but because HRV's exchange moist inside air for generally drier outside air, they can also function as dehumidifiers.

The theory behind the operation of a HRV is that moist and polluted inside air can be exchanged for fresh outside air to lower inside moisture and air pollutant levels. For control HRV's are often connected to internal humidistats which measure the humidity level inside a home and activate the HRV if the humidity is above a manually fixed set point. Because high indoor moisture levels are closely associated with high indoor air pollutant levels a separate pollutant sensor is not normally used.

Many super-insulated homes have also been equipped with manually activated timer switches to initiate a timed HRV run to rid the home of anticipated very high moisture levels to be created by cooking, bathing, etc.

In addition, some later tightly sealed homes have been built with two speed HRV's which run continuously to provide more positive control of air pollutant levels. These HRV's normally run at a low speed, but operation at a higher boast speed can be initiated by either a humidistat or a timer switch, to remove excess moisture from the house.

Both types of humidistatically controlled HRV's now in use have reduced the level of indoor air pollutants and made it possible to lower internal moisture levels by exchanging inside air for outside air, but not all problems have been solved. In particular, it should be noted that outside air varies in moisture content just as does inside air, and that even cold generally dry winter climates such as those found in central Canada experience periodic high moisture levels, particularly at the beginning and end of the heating season when precipitation often falls as rain. This means that there will be times when the cooler outside air contains more moisture than the warmer inside air in absolute terms so that an exchange of air would refresh the interior but increase the moisture level in the home.

Unfortunately, HRV's which are controlled solely by an internal humidistat cannot compare the absolute moisture contents of inside and outside air, and so they will at times exchange high moisture outside air for lower moisture inside air thereby needlessly increasing the moisture in the home. This problem is accentuated when a HRV is run continuously. It should also be noted that the installation of a HRV increases air circulation in this type of home but this has not satisfactorily solved the problem of uneven inside temperatures caused by differential solar heating.

An "intelligent" homeowner who decides to measure the inside and outside relative humidities to determine whether an air exchange can be performed and who sets the humidistat appropriately is no further ahead. This is because relative humidity is a temperature dependent quantity which expresses the moisture content of air as a percentage of the total volume of moisture that air at that temperature can hold. Consequently, relative humidity readings taken at different temperatures cannot be compared directly to tell if a body of air at one temperature contains more or less moisture than another body of air at a different temperature.

An added obstacle to obtaining a correct humidistat setting is that the average home is quite often empty for long periods of time during which the outside moisture level can change. This means that although a homeowner may set the humidistat correctly upon leaving for work in the morning, outside conditions may change making the chosen humidistat setting inappropriate. For instance, if the outside air is very dry and no rain is forecast, the homeowner may set the humidistat low to rid the home of built-up moisture. If there is unexpected rain which results in an elevated outside moisture level then the HRV will be exchanging moderately moist inside air for very moist outside air and the inside moisture level will be rising rather than falling. The homeowner will arrive home that evening to a damp home and later in the evening, when the outside temperature drops, water may well condense on the windows and run down onto the window sills, walls and floor causing damage to the interior shell of the home. If this happens repeatedly, severe damage to the window frames, adjacent woodwork and wall coverings will result.

In addition to the above noted limitations, manual control is further complicated by changing conditions inside the home. For example, without manual compensation, the air quality inside a tightly-sealed home would deteriorate severely if an unusually large number of people were in the home, for instance, at a party. The problem will be accentuated if some of these people are smokers.

OVERVIEW OF THE CURRENT INVENTION

The current invention is a dynamic environmental control system for controlling the environment in a super insulated tightly sealed home which uses an HRV connected to a forced air heating system for ventilation.

The system performs a number of functions according to predetermined priorities. Firstly, for health reasons, the system will initiate an air exchange if HRV running times have been inadequate to ensure a minimum fresh air content and at the same time to dilute air pollutants which build up over time in an unventilated home. Also, in order to minimize the effects of high humidity outputs caused by cooking, bathing, washing or drying, the system permits the user to initiate a timed HRV run to rid the home of the anticipated humidity. Such operations are special events which are activated over a background monitoring of inside temperature gradients which can be equalized by the system activating a forced air system whenever a preset maximum value is exceeded.

The inventive system may also function in one of its aspects as a seven day four temperature setback thermostat and is programmed to initiate an HRV run to remove humidity from a home if the humidity level is not within a desired range or if an inside dewpoint violation is likely; provided that the inside and outside moisture levels are favourable for removing humidity from the home.

The invention is limited in that it is designed for use during the heating season when a heater and an indoor ventilation system are in use and when the windows are closed to seal in the environment in the home. The invention is also restricted by climatic conditions in that it can only be used effectively in relatively dry climates where the moisture content of outside air is normally lower than the desired moisture content of inside air. For this reason the system would be less suitable for use in areas which experience a regular extended rainy season of several weeks or more during the heating season.

LIST OF FIGURES

DESCRIPTION OF A PREFERRED EMBODIMENT

Construction, installation and use of the invention will now be explained with reference to a preferred embodiment designed for use in an exemplary tightly sealed and super insulated bungalow with a living area of approximately 1300 sq. feet located in a northern climate such as that found in southern Ontario, Canada.

Figure 1:
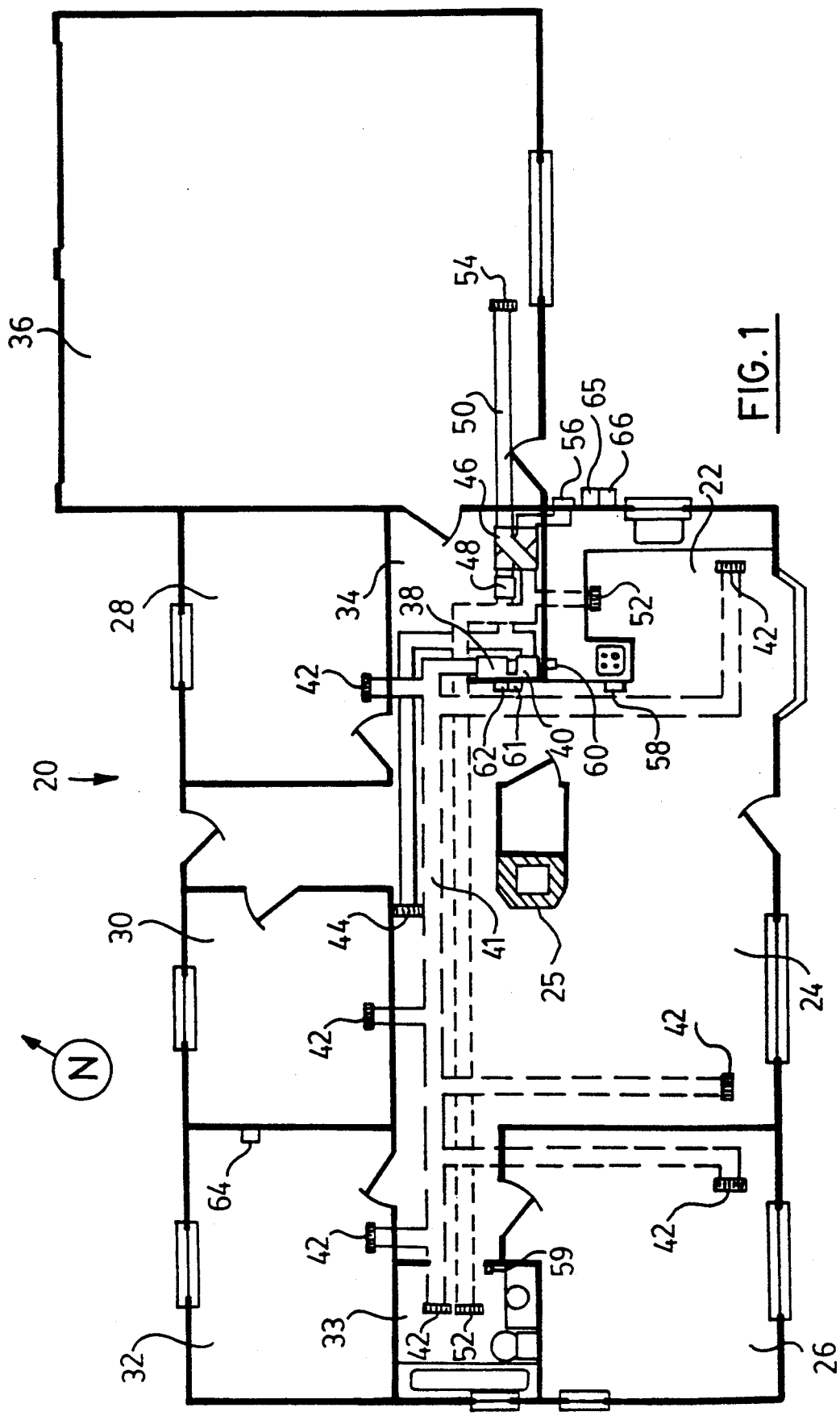
FIG. 1 is a plan view of the installation layout of a preferred embodiment of the invention in a typical tightly sealed, super insulated home.

Reference is first made to FIG. 1 which shows the floor plan of the home in some detail. On its south side, the home 20 includes a kitchen 22, a living room 24 with a fireplace 25 and a bedroom 26, while on the north side there is a study 28, a sitting room 30 and a bedroom 32. A bathroom 33 is located at the west end of the home, while a small furnace room/storage area 34 and a two car garage 36 are located at the east end of the home. The bungalow includes all of the usual features found in super insulated homes at these latitudes, including twice the insulation normally required by local building codes, a tightly sealed shell, double glazed windows, special window and door seals and a passive solar design.

Heating requirements are met by a forced air heating system with a two kilowatt electric heater 38 and an air circulation fan 40 which are located in the furnace room 34. The heater 38 and the circulation fan 40 are connected in series to a duct system 41 with hot air registers 42 located in each room of the home's living quarters and a single centrally located cold air return register 44.

The heating system operates in a conventional manner, that is with the air circulation fan 40 drawing air through the cold air register 44, forcing it into the heater 38 where it is heated and then out through the hot air registers 42 located around the home.

An air ventilation system is also installed in the home for replacing stale inside air with fresh outside air. The air ventilation system consists of a model WR25 heat recovery ventilator 46 manufactured by the PM Wright Company of Montreal, Canada, a 1 kilowatt electric preheater 48 and a duct system 50. Warm moist and polluted air can be withdrawn from the home by the HRV via two inside air registers 52 located in the kitchen and bathroom respectively, and expelled through an exhaust register 54 located in the garage, while at the same time fresh but cold outside air is introduced to the HRV through intake register 56. When it is operating the HRV 46 extracts heat from the outgoing air to warm incoming air thereby minimizing heat losses. Incoming air is passed from the HRV through the preheater 48 to warm it further thereby avoiding the introduction of partially heated air to the home. Incoming air is fed from the preheater 48 to the duct system 41 on the cold air return side of the air circulation fan 40 and then if the heater 38 is running, it is fed through the heater 38 and out the hot air registers 42 otherwise it passes through the duct system 41 in the other direction and exits through the cold air return register 44.

In accordance with the preferred embodiment of the invention there is a control system which replaces the thermostat, humidistat and manually activated timer switches normally found in this type of tightly sealed home. The control system has three main blocks of equipment. Firstly, there is a device block. It includes those devices which can be manipulated to control the environment inside the home. The heater 38, air circulation fan 40, HRV 46 and preheater 48 are all included in this block. Also part of this block is a 24 VAC control module which controls the power supply of these devices in response to signals from other parts of the control system.

Figure 2:
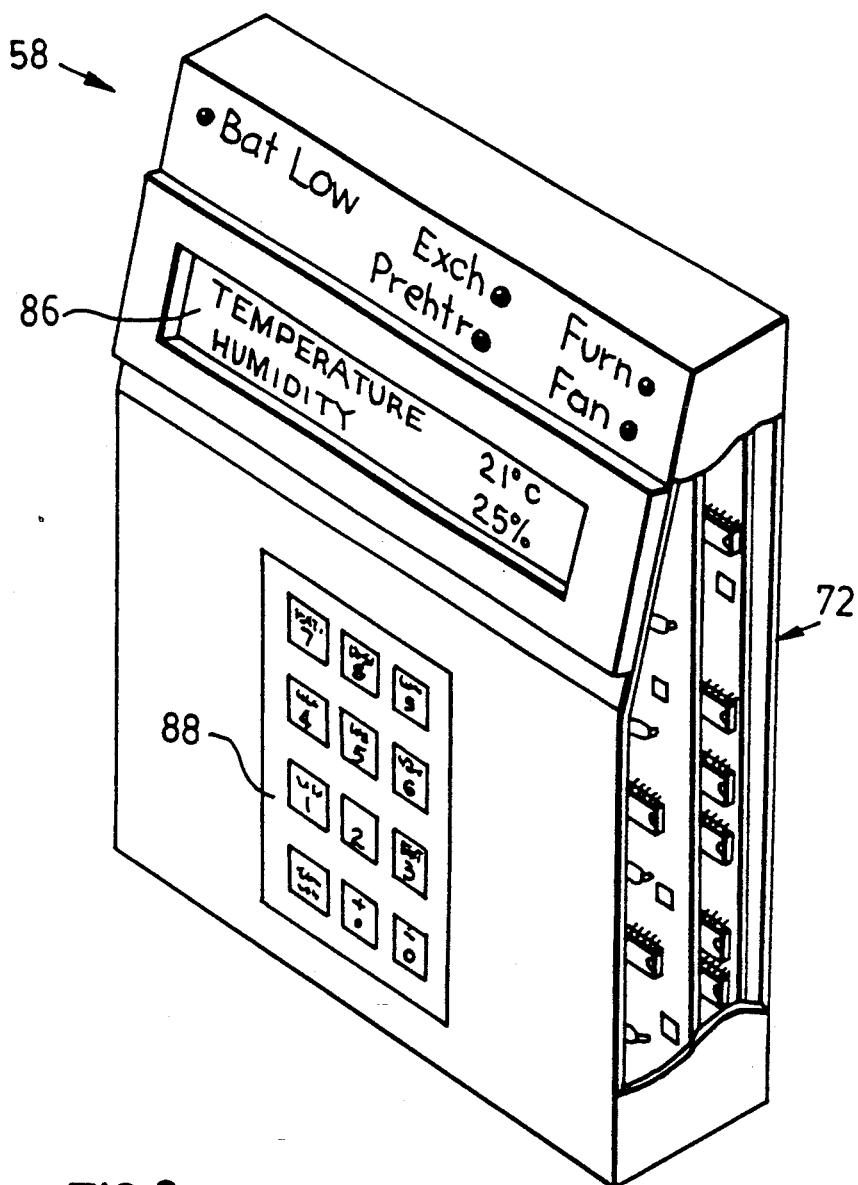
FIG. 2 is a perspective view of the control housing of the invention with a portion cut away.

Secondly, there is a circuitry block which makes all of the environmental control decisions. The circuitry block is located in housing 58 which is shown in FIG. 2.

Thirdly, there is a sensor block which provides the circuitry block with information on environmental conditions both inside and outside the home. Included in this block are two timer switches, located in bathroom 59 and kitchen 60 respectively. Also as part of this block are inside sensors including a humidity sensor 61 and main temperature sensor 62 which are located in the living room and an auxiliary temperature sensor 64 which is located in the north bedroom. Finally there are outside temperature 65 and humidity 66 sensors located adjacent the intake register 56.

In operation the control system maintains internal humidity, pollutant and temperature levels within desired ranges in accordance with a scheduled of priorities starting with air quality and followed by inhabitant comfort, building shell preservation and energy conservation. To accomplish this the control system can operate the heating and ventilation equipment in a number of modes.

The highest priority mode of operation is the mandatory exchange mode which can be used to cause an air exchange when the occupant causes local increases in humidity or pollutants by, for instance, bathing or using adhesives. The HRV is then operated manually to rid the home of the moist or polluted air regardless of the relative moisture content of the incoming and outgoing air. This mode is also operated periodically by the system to ensure some air is exchanged. The mode can be triggered in one of two ways.

Firstly, the mandatory exchange mode can be triggered manually by the timer switches. These switches allow the occupants to initiate a mandatory air exchange of a fixed duration to improve air quality inside the home. The switches are mainly provided for exhausting very high moisture air created by cooking and bathing before the moisture contained in that air can diffuse to the rest of the home and eventually trigger operation of the HRV. They can also be used, for example, to initiate an air exchange to rid the home of cooking smoke, painting fumes, etc.

Secondly, it can be triggered by a software timer in the control system which ensures the HRV runs a minimum number of minutes per hour thereby ensuring that inside air pollutants do not accumulate and that there is a regular incoming supply of fresh air. The minimum duration of this exchange and the interval required between exchanges to meet minimum government standards for air circulation in tightly-sealed homes, is calculated by the system from operating parameters which can be input by the homeowner, including: the size of the home; the heat recovery ventilator fan flow; the number of occupants; the percentage of those occupants who smoke and the number of plants in the home.

The second most important mode of operation is the temperature mixture mode. In this mode the control system measures the temperature gradient across the structure by comparing the temperature reading of the temperature sensor in the living room with the reading of the sensor located in the north bedroom, and it initiates an inside air redistribution using the air circulation fan 40 if the temperature gradient across the structure exceeds a preset value. Differential solar heating can cause temperature gradients of 10° C. or more across the structure making some sections of the home unbearably warm while others remain cold. This is a common problem with passive solar structures which usually have large expanses of glass on one side allowing the midday sun to heat rooms in that portion of the home. The temperature mixture mode redistributes the available heat to give a more uniform temperature across the structure, primarily for human comfort but also to provide energy savings by using heat from a warmer part in colder parts of the house. For instance moving the heat from southern sunny exposures where the house may be too hot, to colder northern exposures which may be too cold.

The third most important mode of operation is the temperature maintenance mode in which the control system functions as a seven day, four temperature setback thermostat. In this mode the heater 38 and air circulation fan 40 are normally operated to maintain internal temperatures according to time/temperature pairs which can be entered into the control system by the occupants. This mode allows the occupants to program a heating schedule which will maintain a warm home during their regular presence but allow the temperature to drop during their absences, or while they are in bed to conserve energy. This mode also has a vacation setting, which overrides the recorded time/temperature pairs to maintain the home at a constant temperature.

The final mode of operation is the humidity control mode in which the HRV is operated to remove moisture from the home. This mode also has two settings. In the first, the control system operates the HRV to minimize internal humidity levels and in the second the control system optimizes humidity by maintaining as high an internal humidity level as possible while avoiding window condensation the maximum humidity level being a setable value, typically set to about 40% relative humidity. For both humidity minimization and humidity optimization the control system must be able to determine the moisture content of both inside and outside air so that it will know whether inside air can be exchanged for outside air to lower inside moisture levels. A quantity called a mixratio, which defines the ratio of water vapor mass to dry air mass contained in a specific volume, is used to compare the moisture level of inside and outside air. Mixratio (MR) represents an absolute humidity value with no temperature dependence and is defined by the following formula:

$$MR = \frac{RH \cdot rw \cdot VP}{VP + (1 - RH) \cdot rw}$$

where $$rw = \frac{0.622 \cdot VP}{(1013.25 - VP)}$$

and $$VP = \exp\left(55.546 - \frac{6821.331}{(T + 273)} - 5.125 \cdot Ln(T + 273)\right).$$

MR = Mixratio,
RH = Relative Humidity,
rw = mass mixing ratio at constant temperature and pressure,
VP = Water Vapour pressure at saturation,
T = Temperature in Degrees Centigrade In the humidity minimization setting the microprocessor will calculate the inside and outside mixratios using temperature and humidity values measured by the inside and outside sensors. If the outside mixratio is lower than the inside mixratio, which indicates the outside air is drier than the inside air, then an HRV run will be initiated to lower the moisture level inside the home. The goal of the minimization setting is to lower inside humidity to a health recommended minimum value, which is typically set to 15%, and as a result the HRV will be operated anytime a comparison of the mixratios indicates that the outside air is drier than the inside air, provided of course that the inside humidity is not less than 15%. The humidity minimization setting is intended for use when the inside humidity is changing too rapidly for the control system to keep up.

By comparison, in the humidity optimization setting the control system does not operate the HRV to lower inside humidity to 15%, but instead operates the HRV to maintain as high an internal humidity level as possible without exceeding a settable maximum value or causing an inside dewpoint violation. In practice dewpoint violations occur mainly on window frames and windows at night when the outside temperature drops and the windows cool off. During the day the sun warms the air in contact with the windows and so the window temperature rarely drops below the inside dewpoint. In the humidity optimization setting the control system allows inside humidity levels to rise during the daytime for energy savings and comfort while at night it maintains the inside dewpoint 5° C. below the window glass temperature to prevent condensation forming on the windows and frames. The inside temperature of the window glass is calculated by the control system from the window glaze rating and the outside temperature; and the inside dewpoint is calculated from the inside humidity and temperature. The control system has an internal time of day clock and calendar and it calculates the daily sunrise and sunset times to determine whether it is night or day. Dewpoint tracking is commenced one hour before sunset and the initial outside temperature is forecast from the lowest temperatures achieved during the previous three nights, to allow the microprocessor to calculate the evening's expected low temperature and lower the internal humidity accordingly. Dewpoint tracking is used during the night time hours to prevent window glass condensation, particularly around sunset as the window temperature drops rapidly to its night time low. Dewpoint tracking is however initiated before the dinner hour to provide a humidity buffer to prevent window condensation which can be caused by cooking. For a similar reason dewpoint tracking is not halted until one hour after sunrise to allow the occupants to shower without causing window condensation.

The setup of the environmental control system will now be explained with reference to FIG. 2 and to the functional block diagram shown in FIG. 3. As previously stated the system, comprises three functional blocks. Firstly there is a device block 70 which performs environmental control functions including exchanging air, redistributing air and heating air. Secondly there is a circuitry block 72 which makes environmental control decisions and initiates the environmental control functions performed by the device block 70. Thirdly there is a sensor block 74 which provides information on the current status of the environments inside and outside the home, for use by the circuitry block 72 in decision making.

Figure 3:
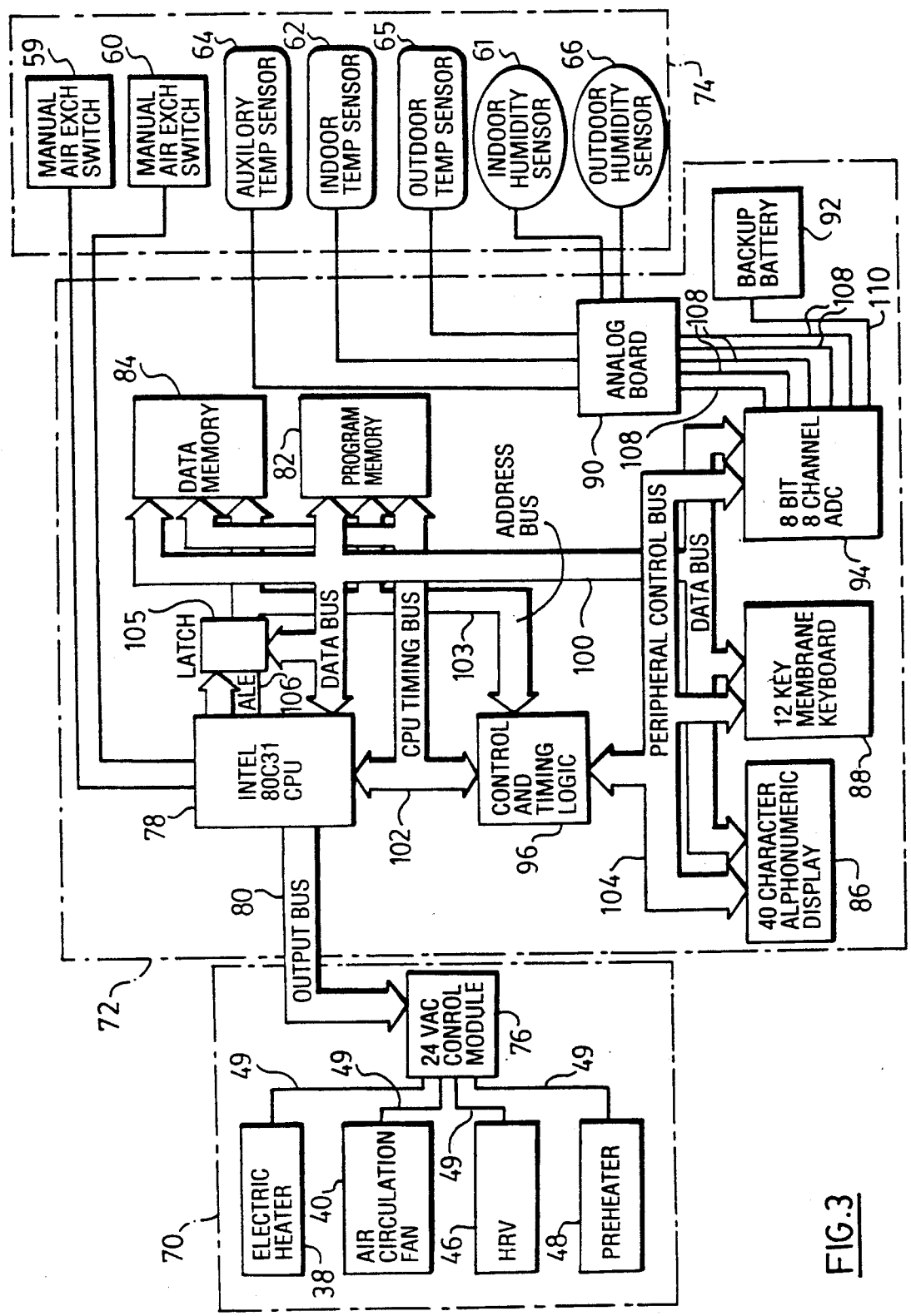
FIG. 3 is a detailed block diagram showing the logic units, bus lines, sensors and devices which make up the preferred embodiment of the invention.

The device block 70 is shown to the left of FIG. 3 and is indicated by a ghost-outline. The block includes the electric heater 38, air circulation fan 40, HRV 46 and preheater 48 which are connected by respective serial lines 49 to a 24 VAC control module 76. This module activates the aforementioned appliances in response to control signals received from the circuitry block 72.

Referring to the circuitry block 72 next, there is an Intel 80C31 CPU chip 78 which performs all decision making. Two memories are also included in the block. A first or program memory 82 of 32 k is used to store the environmental control and interrupt routines and a second or data memory 84 of 2 k is used to store peripheral control routines and operating parameters.

The CPU 78 is connected to three peripherals. The first of the peripherals is a 40 character alphanumeric display 86 which is used to display system status information. Next, a 12 key membrane keyboard 88 is provided to input operating parameters, and lastly, an 8 bit 8 channel analog to digital convertor (ADC) 94 is provided as part of an input interface which also includes an analog board 90 containing interface circuitry for the temperature and humidity sensors, and a backup battery 92 which provides power to maintain data memories during power failures. Analog board signals are converted at the ADC 94 for input to the other components of the circuitry block 72.

Communications between components of the circuitry block 72 are timed by control and timing logic 96. This is facilitated by the use of buses labelled in the diagram for carrying data, addresses, timing control and peripheral controls. The data bus 100, which is used to transfer data inside the circuitry block 72, connects the CPU 78, data memory 84, program memory 82, alphanumeric display 86, keyboard 88 and ADC 94, and is 8 bits wide. The address bus 103 however, is a 16 bit wide bus which transfers addresses from the CPU 78 to the data memory 84, program memory 82 and control and timing logic 96. Output on the address bus 103 is controlled by a latch 105 which can be enabled by a latch enable line 106 that is connected to the CPU 78.

The CPU timing bus 102 connects the CPU 78, data memory 84 and program memory 82 to the control and timing logic 96 and is used to control the timing of signals which are output on the data and address buses.

The peripheral control bus 104 connects the control and timing logic 96 to the alphanumeric display 86, keyboard 88 and ADC 94. This bus is used for communicating both timing and address signals to the alphanumeric display 86, keyboard 88 and ADC 94. Command signals from the CPU 78 to the control module 76 are output on the output bus 80, which is 8 bits wide.

In addition to the buses there are several discrete lines in the circuitry block 72. They include five serial lines 108 which connect the analog board 90 to the ADC 94 and one line 110 which connects the backup battery 92 to the ADC 94. The circuitry block 72 is housed n the control housing 58 as can be seen in FIG. 2.

Turning next to the sensor block 74, which is shown in on the right of FIG. 3 and indicated by a ghost outline, this block consists of a plurality sensors which feed analog signals to the board 90. There are seven such sensors. Firstly there are two timer switches 59, 60 located in the bathroom and kitchen respectively (see FIG. 1) which can be pressed by the home's occupants to indicate that an air exchange is needed.

Secondly, there is a temperature sensor 65 and a humidity sensor 66, both of which are located outside on the east wall of the home adjacent the intake register 56.

Thirdly, there are two inside temperature sensors 62, 64 located in the living room and north bedroom respectively, and an inside humidity sensor 61 located in the living room.

Figure 6:
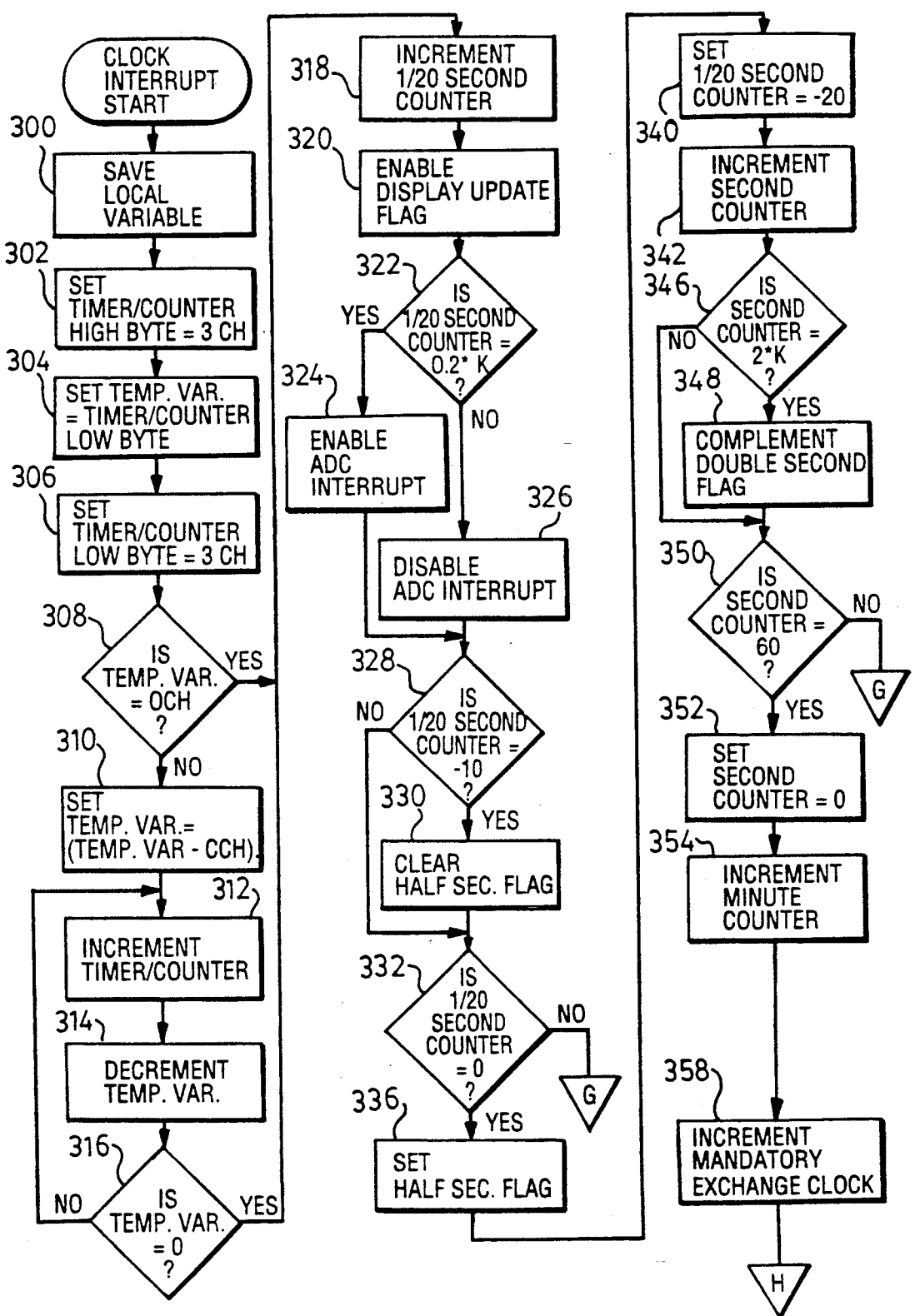
FIG. 6 is page one of a clock interrupt routine flowchart.
Figure 7:
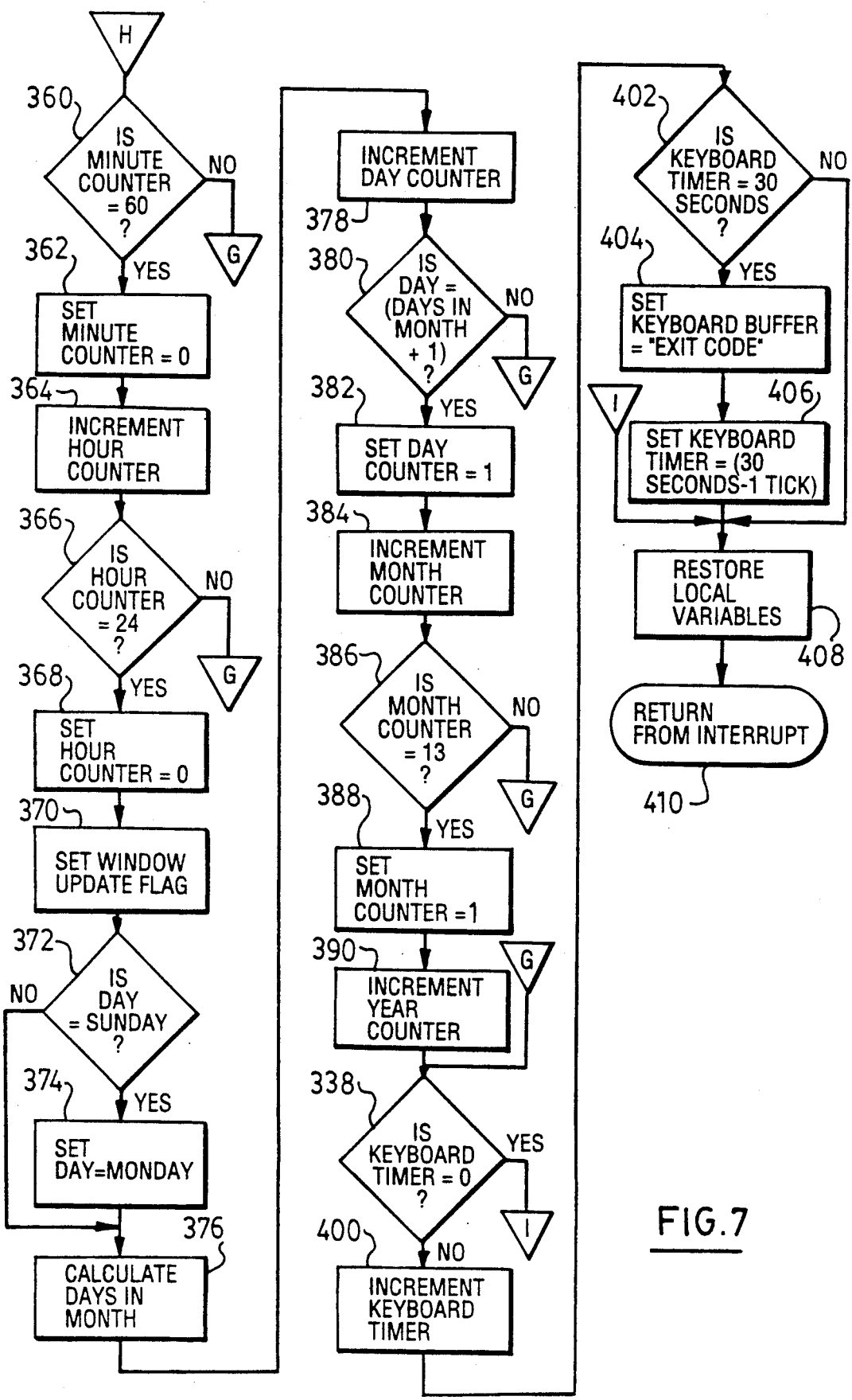
FIG. 7 is page two of the clock interrupt routine flowchart.

Operation of the control system will now be explained with reference to its operational logic. The system operates on a prioritized interrupt structure logic which allows higher priority devices to suspend execution of lower priority service routines. Normally the system cycles repetitively through an environmental control routine (FIGS. 4 and 5) which manages the heater, air circulation fan, HRV and preheater in response to inputs from the sensors. Operation of this environmental control routine can be interrupted by three different prioritized interrupt routines. The first is a clock interrupt (FIGS. 6 and 7) which keeps track of time, day date and month; the second is an analog to digital conversion interrupt (FIG. 8) which updates information from the sensors; and the third is a keyboard interrupt (FIG. 9) which allows the operating parameters to be changed.

An interrupt suspends operation of the environmental control routine in favour of the interrupting routine, however the devices controlled by the environmental control routine continue to operate as per the instructions received from the environmental control routine on its last cycle.

To provide a better understanding of the system control logic, the environmental control routine and the interrupt routines will be explained with reference to the flowcharts shown in FIGS. 4 to 9 and with reference to some of the events which might occur during a typical day in a tightly sealed home.

Figure 4:
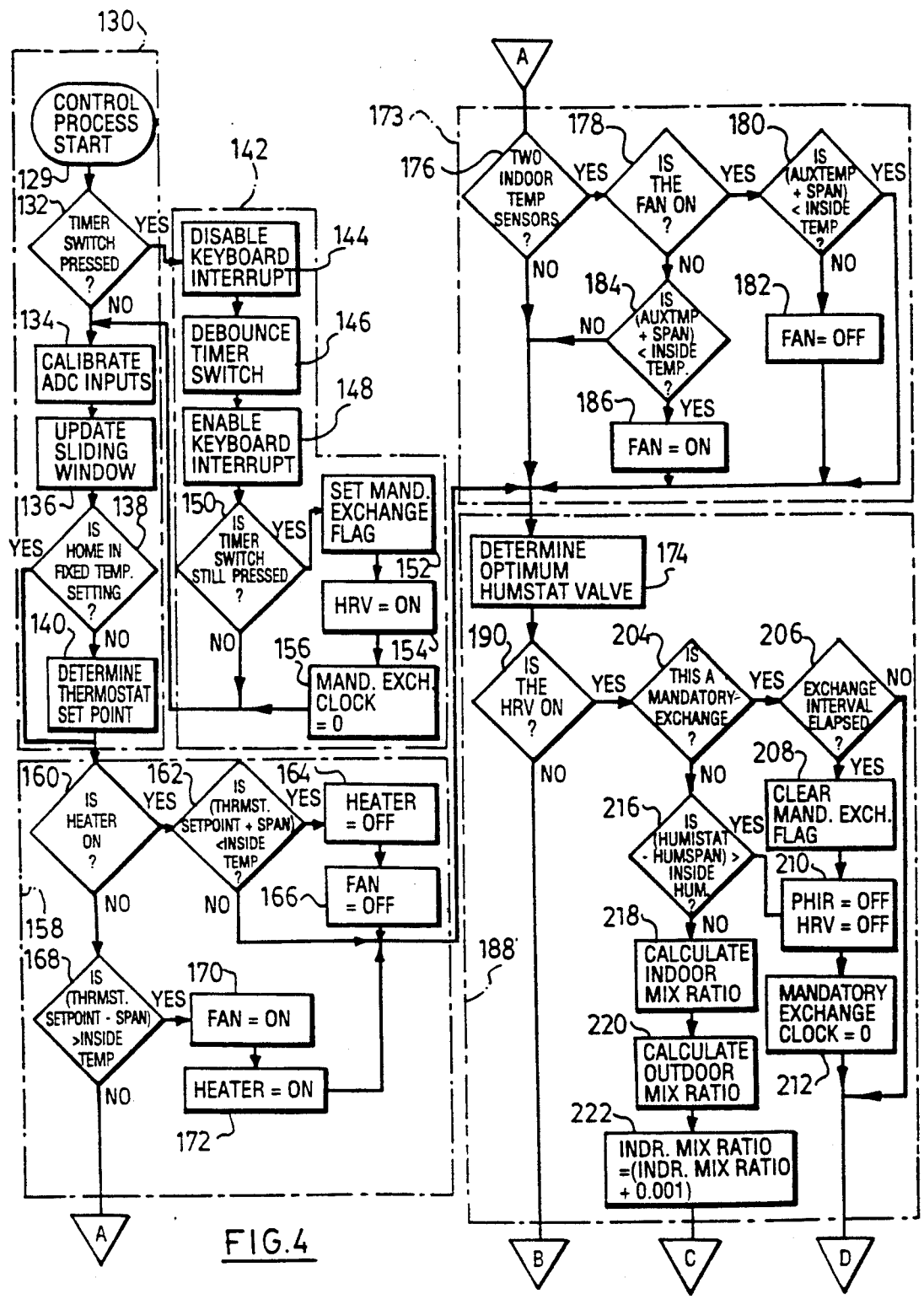
FIG. 4 is page one of an environmental control routine flowchart.
Figure 5:
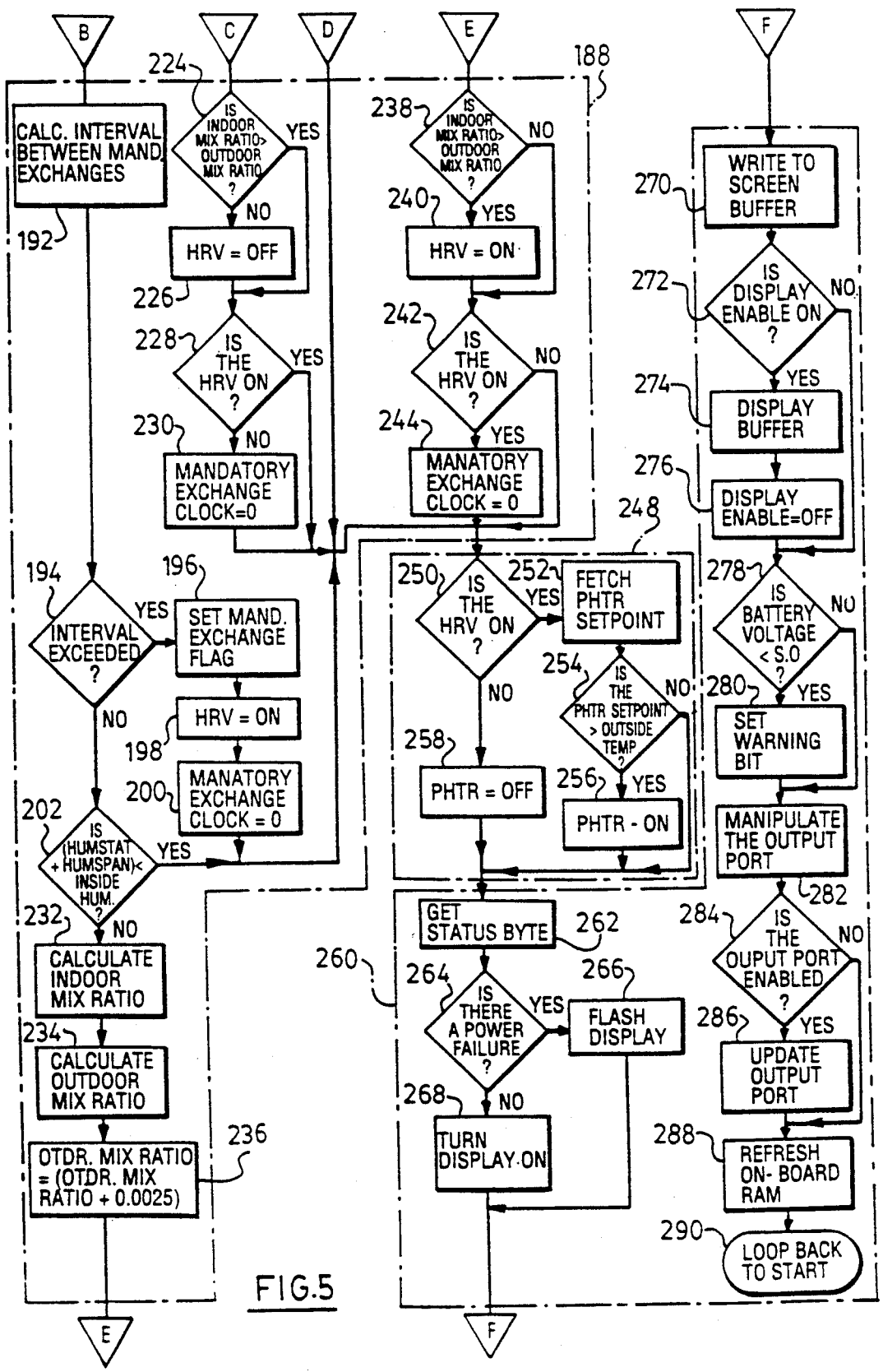
FIG. 5 is page two of the environmental control routine flowchart.

The description will begin with the environmental control routine found on the flowchart in FIGS. 4 and 5. It should be noted that the control system cycles continuously through this routine except when it is interrupted by one of the interrupt routines and that much of the routine is concerned with setting control variable values, which are only output to the devices at the end of each cycle through the routine. For ease of understanding the flowchart has been divided into a number of functional blocks defined by ghost-outlines.

The first functional block called the calculation block and labelled 130 contains control logic for a number of routine calculations and queries which must be performed on each cycle through the routine. Included in these calculations is determining if either of the timer switches has been pressed as shown at box 132 and translating digitized input from the ADC into meaningful units, i.e. degrees celsius for temperature and percent relative humidity for moisture content as shown at box 134. Further down at box 136 the sliding window containing the low temperatures for the previous three evenings is updated.

At box 138 a determination is made as to whether the control system is in the temperature vacation setting. If it is in the vacation setting then the thermostat setpoint has been fixed by the user and therefore will not have to be determined at box 140 and so that box will be skipped. Otherwise the correct thermostat setpoint will be read from the table of thermostat set point values stored in the control system. All of the boxes in functional block 130 are traversed on each cycle through the environmental control routine except for box 140. Box 140 is skipped whenever the system is in the temperature vacation setting because a user entered vacation temperature will be used as a fixed thermostat set point.

If the control system checks the timer switches at box 132 and believes one of the switches has been activated, then it will be branch to functional block 142. In block 142 which is called the user activated exchange block, the keyboard will be disabled, debounced and the reenabled at boxes 144, 146 and 148 respectively. If the result of this process is a decision at box 150 that the timer switch has indeed been pressed, then the mandatory exchange flag will be set at box 152, the HRV control variable set at box 154 and the mandatory exchange clock reset to zero at box 156 before control reverts back to block 130. Otherwise, it will be assumed that the timer switch signal detected at box 132 was an electrical spike and control will revert to block 130 immediately from box 150.

At this point, it should be noted that the mandatory exchange flag is used in the environmental control routine to determine whether an HRV exchange is being conducted to remove moisture from the home or to improve air quality, while the HRV control variable controls operation of the HRV and the mandatory exchange clock is used for measuring both the duration of air exchanges and the interval between air exchanges. At box 156 the mandatory exchange clock is being set to zero to measure the duration of the mandatory exchange.

Proceeding further into the environmental control routine, block 158 is encountered. This block contains the logic necessary for controlling the heater and air circulation fan to maintain inside temperatures in accordance with the values stored in the table of thermostat setpoints. It will be called the heater control block.

The first decision which must be made upon entering this block is whether the heater is on, at block 160. If the heater is active then a check will be made at box 162 to determine if the inside temperature has reached the thermostat setpoint plus a span value which has been included to prevent the heater from cycling on and off. An affirmative answer to this second query will result in heater and air circulation fan control variables being set to off at boxes 164 and 166 respectively. Conversely if there is a negative answer the heater and air circulation fan control variables will be left in the on setting to raise the inside temperature to the desired level.

On the other hand if at box 160 it is determined that the heater is not running than at box 168 the inside temperature will be compared with the thermostat setpoint and the air circulation fan and heater will be turned on at boxes 170 and 172 if the inside temperature is below the thermostat setpoint by a value greater than a preset span value. Otherwise the fan and heater will remain off.

There are two paths existing from the heater control block. From boxes 162, 166 and 172 the control logic will branch to box 174 where an optimum humidistat setting will be determined. This path is used if the heater has been running or if the heater control variable has just been set to on to initiate operation of the heater. The air circulation fan is operated with the heater and therefore any temperature gradient existing in the home will be minimized by heater operations.

Conversely if the heater has not been and is not currently running than there is a possibility that differential solar heating has caused a large temperature gradient across the structure. Following box 168 the control logic will proceed to check for differential solar heating.

Functional block 173 defines a section of the control logic where a determination of the internal temperature gradient is made and an internal air redistribution initiated if necessary. Beginning at box 176 a check will be made to determine if there are two temperature sensors for measuring the temperature gradient inside the home. Should there be only one temperature sensor, the control system will be unable to determine temperature gradient and so control will revert to box 174, otherwise control will proceed to box 178.

If there are two indoor temperature sensors the status of the air circulation fan will be queried as indicated at box 178. If the fan is running a comparison of the temperature readings of the temperature sensors in the living room and north bedroom will be made as shown in box 180. A temperature gradient which is less than the span value will result in the fan control variable being set to off at box 182 and the control logic proceeding to box 174 while a larger gradient will result in control reverting directly to box 174 from box 180.

Retracing a path to box 178, it can be seen that if the fan is not running then once again a check of the inside temperature gradient will be made as indicated at box 184. This check will result in either the fan variable being set to on at box 186 or in the fan control variable remaining off. In either circumstance the logic will proceed to box 174.

The next functional block in the flow chart is the HRV control block labelled 188 which encompasses the control logic necessary for controlling operation of the HRV in both the mandatory exchange and humidity control modes.

Entrance to this functional block is at box 174 where a calculation of the optimum humidistat setpoint will be made, as indicated, to aid in determining whether an exchange of inside air for outside air should be performed to lower the humidity level inside the home. This calculation will take into account the temperature on the inside of the window glass and the time of day.

Next at box 190 a determination is made as to whether the HRV is operating. If the HRV is inactive then a calculation is made of the allowable interval between mandatory exchanges and a check is made to determine if the allowed interval has been exceeded as shown in box 192 and 194 respectively.

If the period between exchanges has been exceeded then the mandatory exchange flag and the exchange control variable will be set and the mandatory exchange clock reset as stipulated at box 196, 198 and 200 respectively. If the period between exchanges has not been exceeded then, the control logic will proceed to box 202.

Working back to box 190 it will be seen that should the HRV be running, a check will be made at box 204 to see if the exchange is a mandatory one by testing the status of the previously mentioned mandatory exchange flag. If the flag is set, the mandatory exchange clock will be tested to determine if the exchange interval has elapsed as stated at box 206. If the interval has elapsed a subsequent test will result in the mandatory exchange flag being cleared, the preheater and HRV control variables being set to off and the mandatory exchange clock being reset to zero as shown in boxes 208, 210 and 212. However, if the interval is still pending completion boxes 208 to 212 will be bypassed. The steps in boxes 204 to 206 allow a mandatory exchange to be terminated once the mandatory exchange period has elapsed.

When the control logic progresses down either of the paths ending at boxes 200 and 212 no determination of the necessity of conducting an air exchange is made and the control logic passes directly to box 250.

Returning to box 204 it can be seen that if the exchange is not mandatory then it must be a humidity control exchange and therefore the humidistat setpoint must be checked against the inside humidity as indicated at box 216. Should the inside humidity be less than the humidistat setting minus a span value, then the inside humidity does not need to be lowered further and the preheater and HRV control variables can be set to off at box 210. Otherwise, it is desirable to lower the inside humidity and therefore the inside and outside mixratios must be compared to determine if the HRV can be operated to remove moisture from the home. To accomplish this the indoor and outdoor mixratios are calculated as shown in boxes 218 and 220 respectively and a small span value is added to the inside mixratio as indicated at box 222 to prevent cycling. As indicated at boxes 224 and 226 respectively, the mixratios are then compared and the HRV control variable switched to off if a comparison of the ratios shows that the inside moisture level cannot be lowered by exchanging inside air with outside air.

Should the HRV control variable have been left on then from box 228 the control logic will branch directly to box 250, but if the HRV control variable has been set to off then the mandatory exchange clock will be set to zero as the control logic branches through box 230 to keep track of the interval between exchanges.

The path from box 202 down through boxes 232 to 242 is equivalent to the path starting at box 216 and running through to box to 230 except in the former case the HRV control variable starts in the off setting and the mixratios are compared to determine if the exchange variable can be turned on, whereas in the latter the HRV control variable starts in the on setting. Each path provides a different span value to prevent cycling. When the control logic resets the mandatory exchange clock at box 244, it is being done to measure the length of an exchange rather then the interval between exchanges which is the case for the clock after the box 230.

From block 188 the control logic proceeds to the preheater control functional block, labelled 248. This block controls operation of the preheater by setting or resetting the preheater control variable. Entry to the block is at box 250 where the control logic determines the whether the HRV control variable is on. If the HRV control variable is disabled then the HRV will not be turned on at the end of the current cycle through the environmental control routine and the preheater will not be needed. The preheater control variable will then be set to off as stipulated in box 258 and the control logic will proceed to functional block 260.

If on the other hand it is determined at box 250 that the HRV control variable is set to on, then the preheater set point must be retrieved and if it is greater than the outside temperature, the preheater control variable set to on as noted in boxes 252 to 256, before block 260 is reached.

The final functional block in the environmental control routine flowchart is the output block 260. Environmental control decisions are not made in this part of the flowchart, but instead circuitry control functions are performed.

The first of these is a check of the status byte which is performed to determine if there was a power failure and if the display should be flashed to warn the user as noted at boxes 262 to 268. If there has not been a power failure the display will be normally refreshed as indicated at boxes 270 to 276 and control passed to box 278.

As noted in box 278, a check of backup battery voltage will be made and the warning bit set at box 280 if the voltage is low.

If the user has enabled the output port at box 284, the port will be configured by the environmental control variables which have been set during the last cycle through the environmental control routine and will be output to the 24 VAC control module to control appliance operation till the end of the next cycle through the routine. The final step in the routine is to refresh the onboard data memory as shown at figure 288 before the control logic loops back to begin the routine again.

As previously noted there is a clock interrupt routine (FIGS. 6 and 7) which keeps track of the time of day, date, month and year. This routine makes use of an internal timer counter in the CPU which increments a programmable 16 bit register on each machine cycle. A clock interrupt is generated each time the timer counter rolls over to zero whereupon the interrupt is initiated.

Referring to the flowchart the first function performed during the interrupt is the storage of local variables which will be required when the control system reverts back to the environmental control routine, as stated in box 300.

Proceeding further down the flowchart, boxes 302 to 316 contain the logic required for correcting the irregular interval between clock interrupts. The irregularity is due to the variable number of CPU instructions which can be executed before the interrupting routine assumes control. At box 302 the correction begins with a the high byte of the timer counter register being reset to the correct negative count for the next counting cycle. Next, the value of the low byte of the timer counter register, which varies from cycle to cycle, is saved and the low byte preset to the correct negative count for the next counting cycle as noted at boxes 304 and 306.

Subsequently, at box 308 the previous value of the counter timer low byte is checked against the ideal count value to determine if time correction is required. Should no correction be required the control system will branch directly to the updating section of the routine which begins at box 318, otherwise it will subtract the ideal count value from the previous timer counter low byte at box 310 to get the count error. At boxes 312 to 316 the next timer counter register starting value will be incremented to change the length of the interval to the next clock interrupt to provide compensation for the error in the past count time interval.

From box 316 the control will branch to box 318. Clock interrupts occur every one twentieth of a second and so at box 318 the one twentieth second interval counter is incremented. A display update flag used by the main routine display code is set at box 320.

Boxes 322 to 326 toggle the ADC, to interrupt the environmental control routine every 0.20 seconds thereby effectively reducing the number of times the external sensors need to be examined.

At box 328 the one twentieth-second counter is tested to see if a half-second has elapsed. If a half-second has elapsed a half-second flag, used to flash the display, will be set, otherwise box 330 is skipped. Moving onto box 332, a check is made to see if the one twentieth-second interval counter is zero. If the interval counter does not equal zero then control will jump to box 338 because the second, minute, day, month and year counters need not be updated, otherwise the half second flag will be set and the one twentieth second interval counter reset to minus 20 to count another one second interval as noted at boxes 336 and 340. Next the second counter is incremented at box 342.

In boxes 346 and 348 a double second flag used by the display routine for a 2 second delay, may be set after which a check is made at box 350 to determine if a minute has lapsed. Should 1 minute have elapsed the second counter will be reset to zero and the minute counter incremented as shown in boxes 352 and 354. At box 358 the mandatory exchange clock will be incremented.

If at box 360 the minute counter is found to be equal to 60 then it is set to zero at box 362 and the hour timer is incremented at box 364. Conversely if the minute counter is not equal to 60, at box 364 the control will jump to box 338.

The hour counter is checked at box 366 and reset to zero at box 368 if it is equal to 24, otherwise the control logic branches to box 338.

If a new day has been detected at box 370 the window update flag is set to advance the 3 day sliding window and to enable recording the lowest temperature for the current day. Boxes 372 and 374 increment the current day of the week and ensure that the day counter is reset to Monday following Sunday.

The number of days in the current month is calculated at box 376 and date counter is incremented at box 378. If at box 380 it is determined that the current month is over, then the date counter will be reset and the month will be incremented at boxes 382 and 384 respectively.

A similar process will occur to boxes 386 to 390 with the current month counter.

Subsequently the keyboard timer is checked to determine the presence of user related keyboard activity. If the keyboard timer is equal to zero at box 338 then there is no user input taking place and the routine simply proceeds to the start of clock routine exit sequence at box 408. However, if the keyboard timer is nonzero the value is incremented at box 400 and the timer value, which indicates the length of the idle keyboard period, is compared with the maximum allowable period of 30 seconds at box 402. If the maximum period is exceeded then the keyboard input buffer is set to the keyboard routine exit code at box 404. This exit code ensures that if an user input sequence is left idle for longer than 30 seconds the controller exits the keyboard input routine and returns to the environmental control routine. Box 406 presets the keyboard timer to 1 clock tick (one twentieth of a second) less than 30 seconds to provide a mechanism for a quick exit from lower levels within the hierarchically structured parameter input routines. Box 408 begins the exit sequence by restoring the local variables used by the interrupt routine that were saved on entry, followed by the actual return from interrupt at box 410.

Figure 8:
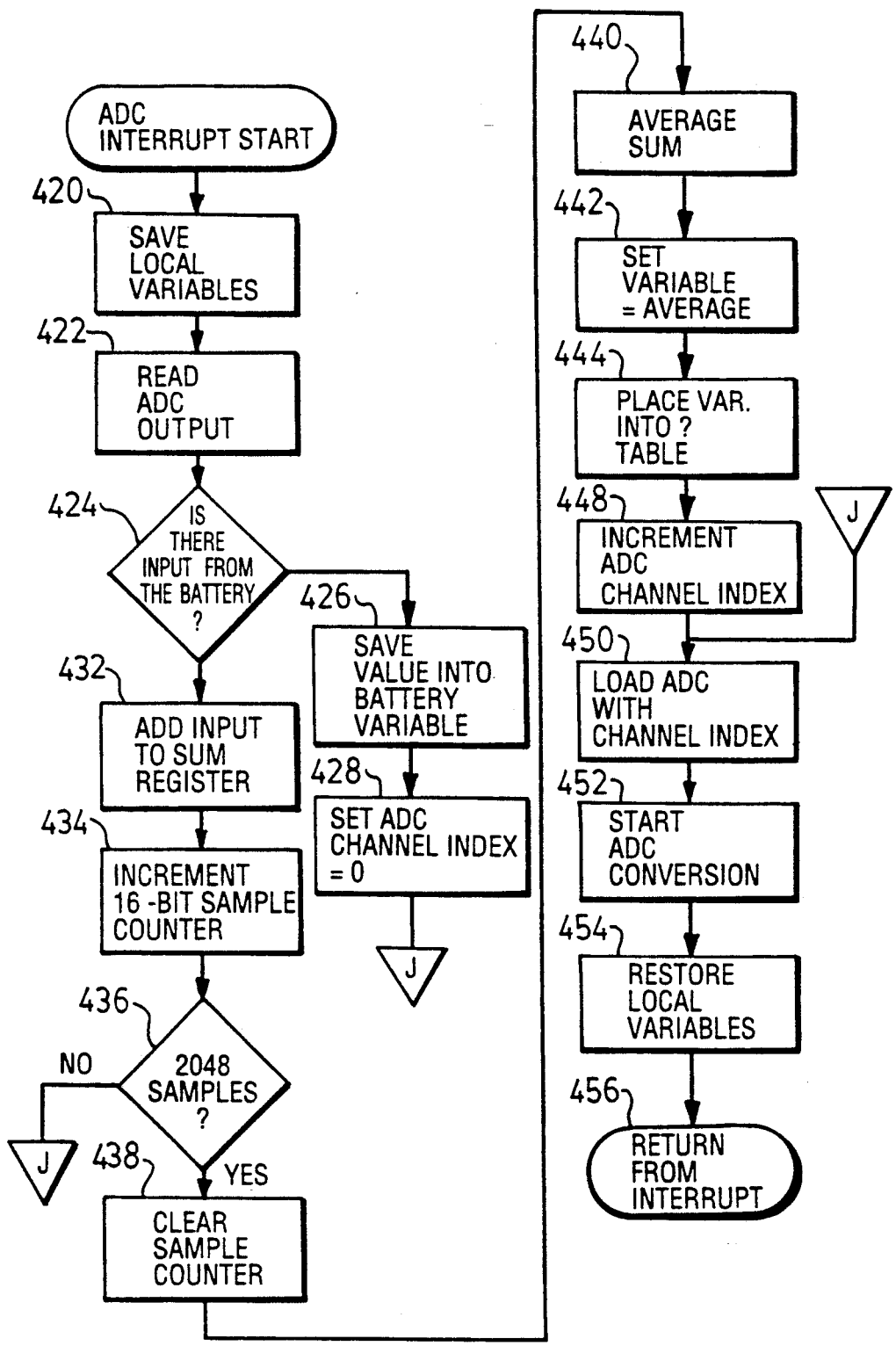
FIG. 8 illustrates an analog to digital conversion routine.

Next the ADC interrupt will be explained with reference to the flowchart shown in FIG. 8. This interrupt runs continuously and is enabled from within the clock interrupt routine at regular intervals. Its purpose is to update the sensor information which is available to the CPU. The routine begins at box 420 by saving the local variables required for operation of the interrupt routine. Subsequently at box 422 the ADC output is read.

Boxes 424 and 426 test if this input is from the backup battery channel and if it is, save the ADC output into a battery variable and reset the ADC channel pointer at box 428. With the index reset the control logic branches to box 450.

If the current input is not from the battery channel then from box 424 the control will branch to box 432 where the input will be added to a summing register. At box 434 a sample counter will be incremented and at box 436 the sample count will be checked to see if all 2048 samples have been input. Should there be fewer than 2048 samples the control system will branch to box 450, otherwise the sample counter will be reset at box 438 and the summing register averaged at box 440.

Next a set variable, which is used by the CPU in calculations, will be set equal to the calculated average value at box 442 and this value stored in a variable table for later use at box 444.

At box 448 the ADC channel index will be incremented and at box 450 the ADC will be loaded with the channel index. ADC conversion will be commenced at box 452 and the local routine variables restored at box 454 before the interrupt ends at box 456.

Figure 9:
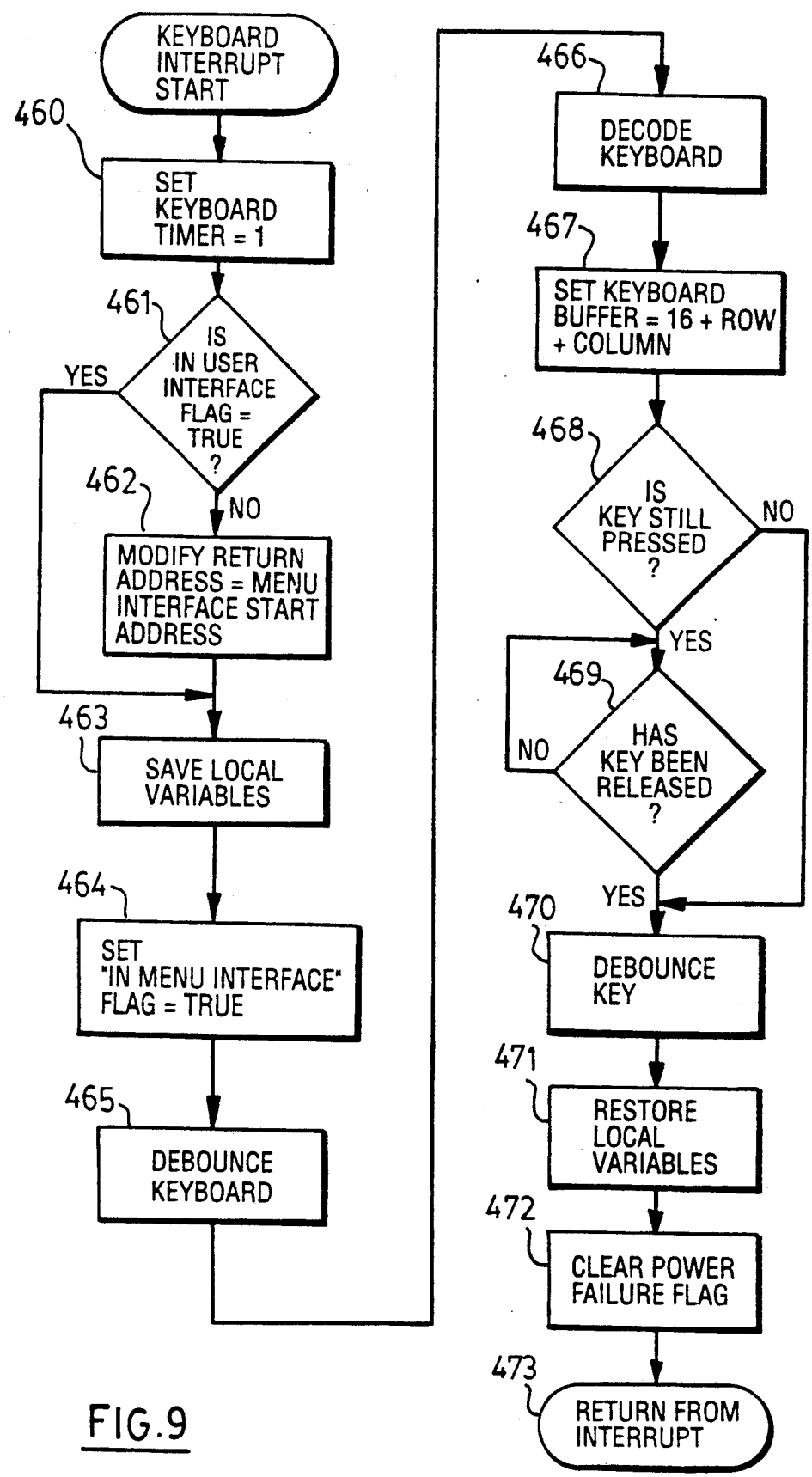
FIG. 9 illustrates a keyboard interrupt routine.

Next the keyboard interrupt will be described with reference to FIG. 9. The keyboard interrupt provides a mechanism for decoding user input, the routine also switches from the normal control loop to a hierachically based parameter menu interface the first time a key is pressed.

On entry into the keyboard interrupt service routine, the system keyboard timer is reset to one at box 460 to restart the 30 second inactivity counter. Next at box 461 it is determined whether this keypress is the first keypress or whether the controller is already in the hierarchical user interface. If the "in user interface" flag is true then box 462 is bypassed. However, if the flag is not set, then this is indeed the first keypress and therefore the start address of the menu interface is used as the return address from the interrupt service routine. The local variables which may be modified by the service routine are saved at box 463. In box 464 the system "in menu interface" flag, which indicates whether the menu interface code is currently being executed, is set to true. Next at box 465 the keyboard is debounced to allow the settling of the mechanical switch connections. Once debounced, the matrix style keyboard is decoded at box 466 to determine the row and column of the active key. With the row and column of the depressed key determined, the information is encoded and stored in the keyboard buffer at box 467. Since the decoding of the keyboard occurs very rapidly, the user keypress will typically endure longer than the decoding sequence, box 468 determines if the key is still depressed after the decode sequence. If the key is still depressed, the loop at box 468 is executed until it is released. Once the key is released it is again debounced at box 470. On exit, the locally modified variables are restored at box 471 and the Power Fail flag is cleared at box 472 to stop the display from flashing following the detection of a power-fail. The routine exits at box 473.

To provide a better understanding of how the environmental control routine functions, the control process will be related to the functions which are performed by the devices in two representative example cycles through the control routine.

The first cycle will occur early on a weekday morning as the occupants are preparing for a new day. It will be assumed that the shower is being used and that a new warmer thermostat setpoint has just been established to warm the home up from the lower nighttime temperatures which are normally maintained. It should also be remembered that at this time in the morning the outside air will be warming up lessening the risk of window condensation and so the humidistat setpoint will may be relaxed thereby allowing the indoor humidity level to rise with no risk of condensation. The example will begin at box 132 where a timer switch signal has been detected because one of the timer switches has been pressed to clear the home of moisture created by the shower. Control will branch to block 142. In this block the mandatory exchange flag will be set, the HRV control variable turned on and the mandatory exchange variable set to zero to initiate a mandatory exchange before control is returned to block 130.

In block 130 the routine calculations will be performed and the new higher thermostat daytime setpoint retrieved. At this time it will also be assumed that the heater is not running and so from box 160 the control system will branch to box 168 where it will determine that the heater should be turned on to raise the inside temperature. At boxes 170 and 172 the heater and air circulation fan will be activated.

A new higher humidistat setpoint will be established at box 174 to allow indoor humidity levels to rise with the expected higher daytime temperatures.

From box 174 the system will proceed to box 190 where it will be determined that the HRV control variable is on, then to box 204 where it will be determined that the exchange is mandatory and box 206 where it will be determined that the exchange interval has not elapsed.

Moving to the preheater control block it will be assumed that the preheater setpoint is warmer than the outside temperature and so the preheater will be turned on at box 256 before functional block 260 is entered.

For this and the next example cycle through the environmental control routine it will be assumed that there was no power failure and so the display will be refreshed normally and the control variables output to initiate device operation inside block 260 before the control system moves back to the start of the routine again. In this first example the cycle will result in the HRV, preheater, heater and air circulation fan all being turned on.

It should be noted that this cycle will be interrupted by the clock and ADC interrupt routines to update the time of day clock and sensor information. There is also a possibility that the occupants may wish to change the control parameters and so there may be a keyboard interrupt initiated by the occupants to do this. These interrupts do not directly influence the operation of the environmental control devices and so have not been included in either of these sample environmental control routine cycles.

The second representative cycle will occur later in the day around noon. It will be assumed that the occupants have not pressed either of the timer switches, the heater is not running and the inside temperature is greater than the thermostat setpoint.

Under these circumstances block 130 will be traversed without branching to block 142.

Next block 158 which controls operation of the heater will also be tranversed in short order because no changes in the heater status are required. The control system will proceed through boxes 160 and 168 into block 178.

This is the block which provides entry into the thermal redistribution mode. At this time of the day the sun will be warming up the southern section of the home and so it will also be assumed that thermal redistribution is necessary. The control system will proceed along the path defined by boxes 176, 178 and 184 to box 186 where the air circulation control variable will be switched to on.

Once an appropriate humidistat setpoint has been established at box 174 control will pass to block 188. For this cycle an assumption will be made that the HRV is running, the interval between mandatory exchanges has not elapsed, the chosen humidistat setpoint is lower than the inside humidity and the moisture content of the outside air is less than that of the inside air. Under these conditions the control system will proceed from box 190 down the flowchart to box 192 where it will calculate the maximum allowable interval between mandatory exchanges and than to box 194 where it will determine that the interval has not been exceeded. Next at box 202 the inside humidity will be compared to the humidistat setpoint. The result will be a decision to exchange inside air for outside air to lower inside humidity if the mixratios are favourable for such an exchange.

At boxes 232 to box 244 the mixratios will be compared, the HRV control variable set and the mandatory exchange clock reset. In this instance the mandatory exchange clock will keep track of the length of the exchange instead of the interval between exchanges.

Proceeding to the preheater control block 248 it will be assumed that the outside temperature does not warrant the use of the preheater and so only boxes 250 and 258 will be tranversed before block 260 is reached. Passage through this block will be accomplished in the same fashion as in the previous example and the result will be that the air circulation fan is turned on to redistribute air inside the home and the HRV is turned on to exchange air while the heater and preheater remain off.

Although particular processes and apparatus have been described herein, it will be apparent to those skilled in the art that various changes and modifications can be made in specific details thereof, within the scope of the appended claims.

We claim:
1. Apparatus for controlling the temperature and humidity in a tightly sealed building during the heating season, the apparatus comprising:
   a duct system providing passage for air to and from various locations in the building;
   an air circulation fan operable to move air through the duct system to provide air to said locations and to draw air from said locations;
   an air heater device in the duct system operable to elevate the temperature of air moved through the duct system by the fan;
   an internal temperature sensor located to sense the temperature of internal air at one of said locations;
   an internal humidity sensor located to sense the relative humidity present at one of the locations;
   an external temperature sensor located outside the building to sense the external air temperature;
   an external humidity sensor located outside the building to sense the external humidity;
   a heat recovery ventilator coupled to the duct system and operable to exchange internal air for external air, the external air being fed by the ventilator to the duct system;
   an air pre-heater coupled to the ventilator and operable to heat air passing from the ventilator to the duct system;
   a control system comprising a device block, circuitry block and a sensor block;
   the device block being coupled to the air heater, the air circulation fan, the heat recovery ventilator, and the air pre-heater;
   the circuitry block including a central processing unit operable to provide control signals to the device block to operate the devices coupled to the device block; and
   an analog to digital conversion device coupling the central processing unit to the temperature and humidity sensors;
   the circuitry block including data means cooperating with the processor for comparing data from e sensors with stored data to continuously compare the relative humidity inside the building with an acceptable relative humidity related to the outside temperature to determine the likelihood of condensation on the windows in the building, and for monitoring the outside relative humidity and inside temperature to provide signals to the device block to operate the devices as needed to heat internal air to maintain a predetermined temperature and to circulate the air in the building, and to operate the ventilator and preheater to expel air carrying an unacceptable moisture content and inspire outside air having a more acceptable moisture content to thereby maintain the moisture content inside the building at said acceptable relative humidity.

2. Apparatus as claimed in claim 1, in which the data means calculates the moisture content of both inside and outside air according to the formula:

$$MR = \frac{RH * rw * VP}{VP + (1 - RH) * rw}$$

where $$rw = \frac{0.622 * VP}{(1013.25 - VP)}$$

and

-continued $$VP = \exp(55.546 - \frac{6821.331}{(T + 273)} - 5.125 * \text{Ln}(T + 273)).$$

where RH is relative humidity, rw is the mass mixing ratio at constant temperature and pressure, VF is the water vapour pressure at saturation, rw is the mass of vapour per mass of dry air, and T is the temperature in degrees Centigrade, and in which the circuitry block will initiate an air exchange to lower the inside humidity level only if a comparison of the mix ratios indicates that the outside air contains less moisture than the inside air.

3. Apparatus as claimed in claim 1, in which the control system further includes switch means which allows occupants to manually initiate a timed exchange of inside air for outside air, irrespective of inside and outside moisture levels, to rid the building of anticipated very high moisture or pollutant levels.

4. Apparatus as claimed in claim 3, in which the control system further includes a timer operable to initiate air exchanges, irrespective of inside and outside moisture levels, to provide a minimum fresh air flow through the building.

5. Apparatus as claimed in claim 1 in which the acceptable relative humidity is determined by calculating inside window temperature using the window glaze rating and inside and outside temperature measurements, calculating the inside dewpoint using inside relative humidity and temperature measurements, and maintaining the inside dewpoint several degrees below the inside temperature, by initiating air exchanges as necessary to control inside relative humidity levels.

* * * * *